A. WINICK.
TIRE.
APPLICATION FILED JUNE 12, 1915.
1,197,987.
Patented Sept. 12, 1916.
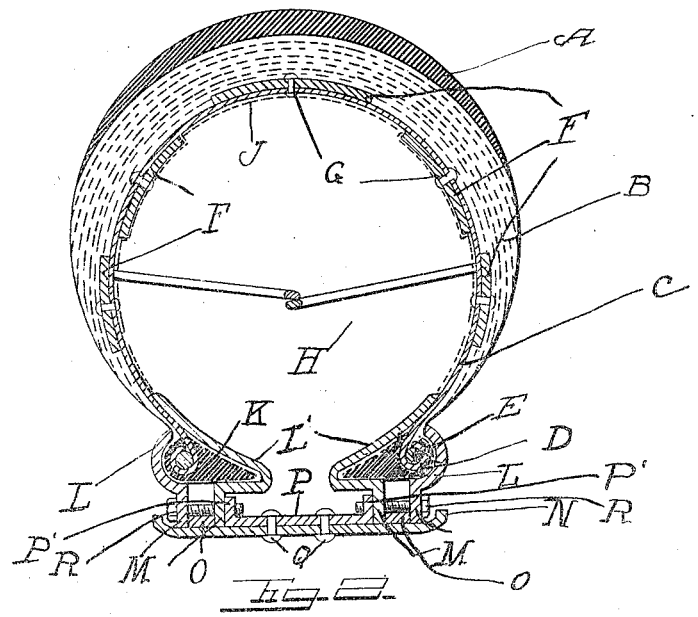
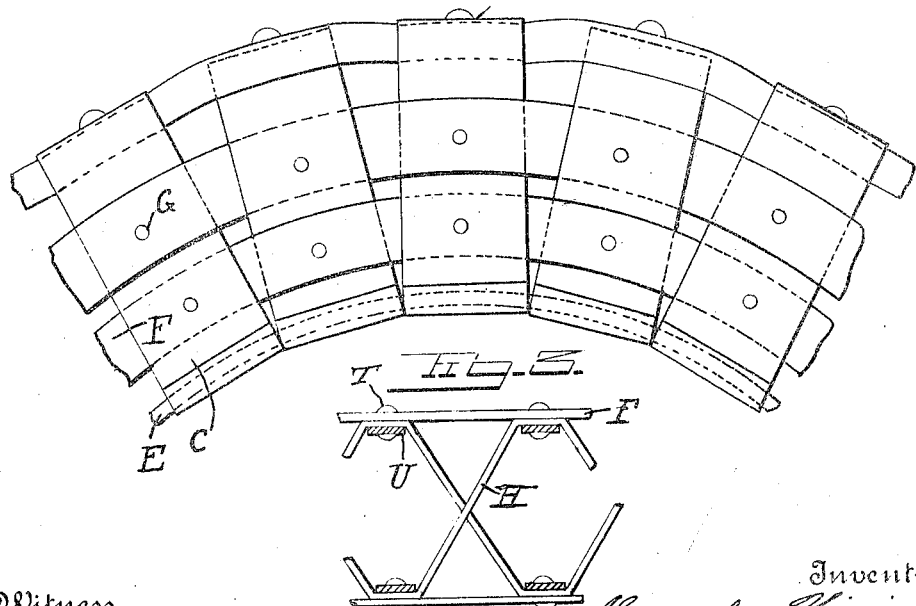
Witness
Ira M. Jones.
M. E. Moore.
Inventor
Alexander Winick.
By
Attorney.

UNITED STATES PATENT OFFICE.

ALEXANDER WINICK, OF JACKSONVILLE, FLORIDA.

TIRE.

1,197,987.　　　Specification of Letters Patent.　　Patented Sept. 12, 1916.

Application filed June 12, 1915. Serial No. 33,722.

*To all whom it may concern:*

Be it known that I, ALEXANDER WINICK, a citizen of the United States, residing at Jacksonville, in the county of Duval and State of Florida, have invented certain new and useful Improvements in Tires, of which the following is a specification.

My invention relates to improvements in tires, such as are usual upon automobiles, and similar vehicles, one object being the provision of a tire which will have the proper resiliency to cause a smooth riding and which will withstand heavy weight and strain without danger of damage or breakage.

Another object of my invention is the provision of means which may be applied to tires in use of the pneumatic type, or be made specially for general use and which will take the place of the usual pneumatic tire.

Another object of my invention is the provision of a tire which cannot be punctured and can not be injured in such manner and which will have a much longer life than the ordinary pneumatic tire.

Another object of my invention is the provision of a tire which will perform all the functions of a pneumatic tire and which by reason of its durability and lasting qualities will be inexpensive, desirable and practical.

To attain the desired objects my invention consists of a tire embodying novel features of construction and combination of parts for service substantially as shown, described and claimed.

Figure 1 is a transverse sectional view of a tire constructed in accordance with and embodying my invention. Fig. 2 is a side elevation of a portion of the skeleton spring frame forming the core or support of the tire, and Fig. 3 is a detail view of the transverse truss frame or bracing member mounted within the spring frame.

In the drawings: The letter A, designates the outer rubber tread surface and B designates the contiguous shoe formed of fabric, or suitable material to provide the casing for receiving the skeleton spring frame. This frame fits within and surrounds the entire rim and is composed of a series of outstanding flat bands C, having their inner free ends formed with loops or eyes D, to receive the retaining and connecting rings E, the said bands being secured in proper relation by means of the circular strips F. These strips are entwined in and out with reference to the bands, as shown and are secured by suitable fastenings G, the whole forming a light skeleton spring frame, upon which the casing is mounted and the frame being laterally braced by the transverse truss frame H, connected to certain of the circular strips F at the points where said strips are inward of the band C, and composed of crossed plate or rod construction as found most desirable, said frame H being secured to the strips F, by the rivets T and washers U.

The spring skeleton frame may be protected by a suitable covering J, and the free inner edges with the sustaining rings may be embedded in the material K, which material and ends are confined and retained between the pair of outer plates L and the pair of inner plates L', which plates are curved to the proper degree to form clamps, and said plates are formed with lugs M, which rest on the rim N, and are properly spaced by the blocks O, and the double flanged plate P, said plate being rigidly secured by fastenings Q to the rim, and the lugs M of plates L and L', and the flanges P', of the plates P, being connected together by means of the clamping bolts R, to secure the casing and frame to the rim.

It will thus be seen that I provide a tire which has a soft tread and which is mounted on a frame which possesses the required elasticity; also that the tire has the necessary accommodating action; also that the improvements may be placed in tires in use or in new tires; also that the tire cannot be damaged by puncture and will have a long life and that generally speaking the improvements produce a practical article of this character.

I claim:

1. In a tire, the combination with a rim, clamps mounted on said rim, an outer casing, a supporting frame in said casing secured by said clamps, said frame consisting of radial bands and circular strips entwined in and out and riveted rigidly at each point of intersection, and a truss frame to prevent lateral movement consisting of transversely extending rods, said rods being securely riveted to certain of the circular strips.

2. The herein described tire, consisting of the outer shoe or casing having the outer rubber tread and inner layers of fabric, a supporting frame in said casing, said frame consisting of radial bands and circular strips entwined in and out and riveted rigidly at each point of intersection, and a truss frame to prevent lateral movement, consisting of transversely extending rods, said rods being securely riveted to certain of the circular strips.

In testimony whereof I affix my signature in the presence of two witnesses.

ALEXANDER WINICK

Witnesses:
   IRA M. JONES,
   J. B. MILLER.